United States Patent [19]
DeLorenzo

[11] 4,113,056
[45] Sep. 12, 1978

[54] FOLDABLE SAW HORSE

[76] Inventor: Mario M. DeLorenzo, P.O. Box 203, Glen Ellen, Calif. 95442

[21] Appl. No.: 763,368

[22] Filed: Jan. 28, 1977

[51] Int. Cl.² .............. F16M 11/00

[52] U.S. Cl. .............. 182/153; 182/181

[58] Field of Search .............. 182/153, 154, 181-186, 182/224, 225, 226; 248/460, 465, 436, 174; 256/64

[56] References Cited

U.S. PATENT DOCUMENTS

| | | | |
|---|---|---|---|
| 1,245,632 | 11/1917 | Straub | 182/181 |
| 1,604,254 | 10/1926 | Bate | 182/153 |
| 1,742,637 | 1/1930 | Dearborn | 182/153 |
| 1,818,516 | 8/1931 | Willis | 182/181 |
| 3,057,591 | 10/1962 | Weimer | 248/460 |
| 3,275,281 | 9/1966 | Sampson | 248/465 |
| 3,460,795 | 8/1969 | Dahlin | 248/465 |
| 3,880,406 | 3/1975 | Stehle | 256/64 |

*Primary Examiner*—Reinaldo P. Machado

[57] ABSTRACT

Complementary leg-defining stampings hingedly secured together at the tops thereof with upper and lower integral struts between the defined legs at opposite ends of each thereof and including a pair of longitudinally extending shelf sections hingedly connected and projecting inwardly from the lower struts and hingedly fastened together at their inner meeting edges.

8 Claims, 10 Drawing Figures

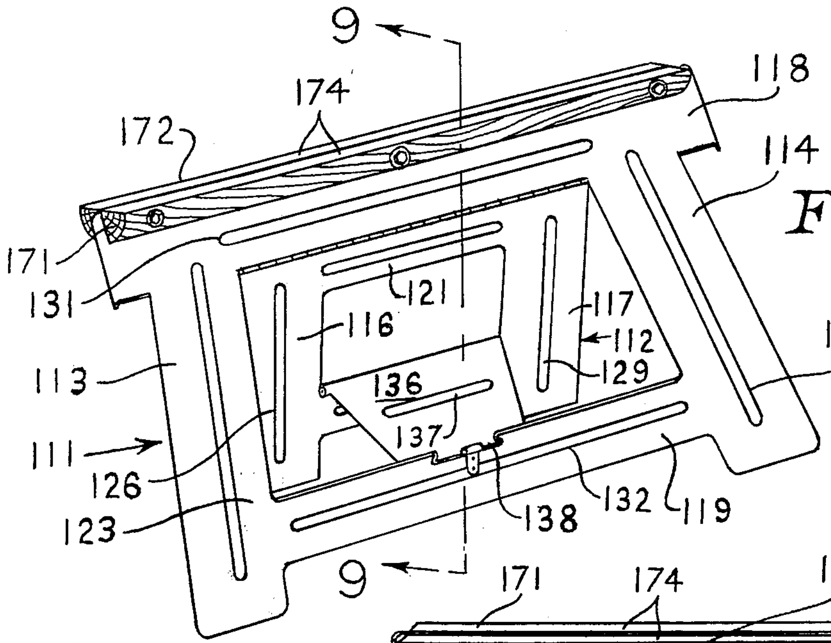
FIG. 7
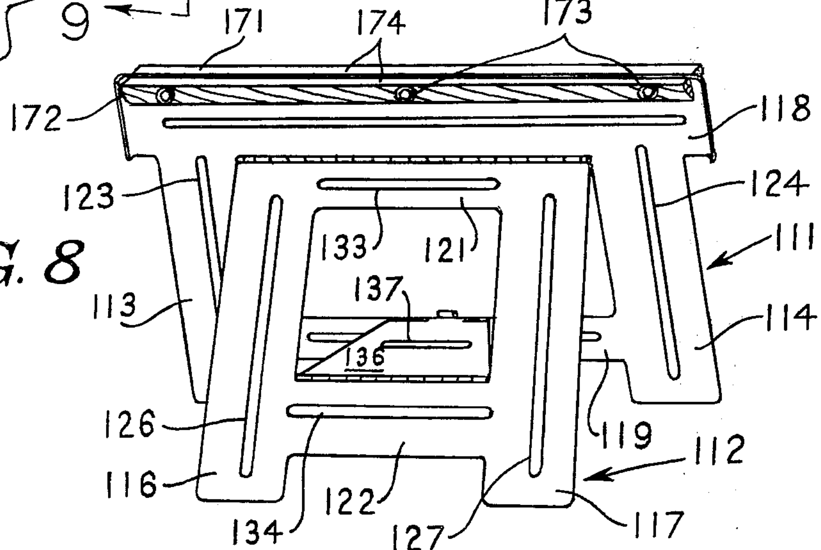
FIG. 8
FIG. 9
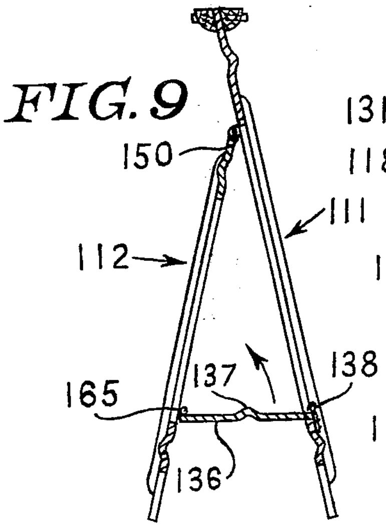
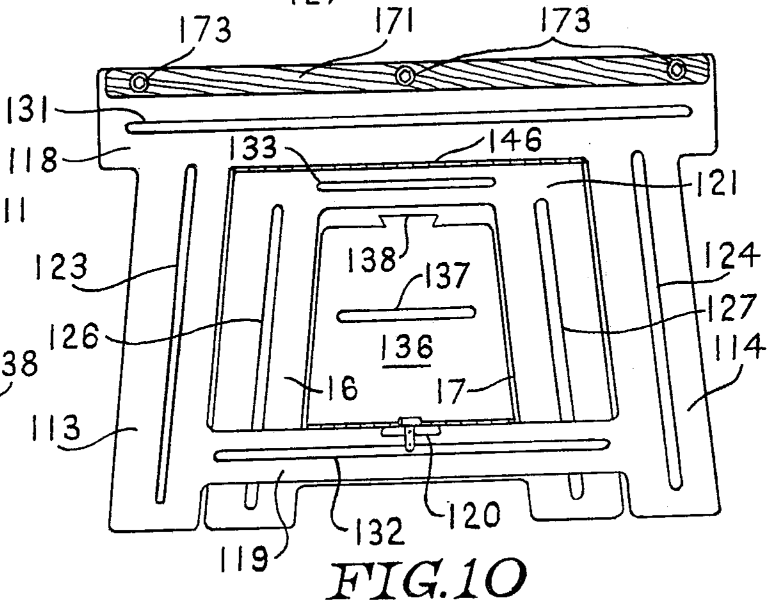
FIG. 10

FOLDABLE SAW HORSE

A number of U.S. Letters Patents have issued on various constructions of collapsible sawhorses or mechanic's trestles, and have been marketed in the past throughout the country. Among prior patents is the D'Angelo U.S. Pat. No. 3,276,545, issued Oct. 4, 1966 which discloses a structure of this general kind that is fabricated of round tubular stock, with longitudinally extending light portions 12 held in spaced relation to one another by a rubber strip 21 and swingably arranged legs at opposite ends so as to collapse them as well as to spread them apart, together with specially constructed links 25 and 26 pivotally connected together and pivoted to the legs, also to enable the collapsing thereof. A foldable trestle horse is disclosed in Berchem et al. U.S. Pat. No. 2,257,876, and a dismantable saw horse is shown in the Keema U.S. Pat. No. 2,823,078, both now expired. My present invention eliminates to a large extent the costly nature of prior foldable trestles and affords a sturdy, durable inexpensive structure which is easily set up for immediate use from its folded or collapsed state.

A primary object of my invention is to provide a foldable saw horse having a minimum number of hingedly connected relatively simple parts which are easily and inexpensively made.

A further object of the present invention is to provide a novel hinge component utilizable as a prime component of my preferred embodiment of my improved saw horse.

Another important object of the present invention is to provide a foldable saw horse of the indicated nature which is additionally characterized by its lightness in weight yet durable structural utility.

A still further object of my present invention is to provide a foldable saw horse of the aforementioned character which is capable of being manufactured from any one of a number of different inexpensive materials without sacrificing sturdiness, and which is as easily set up for use as it is collapsed for storing in a minimum of space.

Other objects of the invention, together with some of the advantageous features thereof, will appear from the embodiments of the invention illustrated in the accompanying drawings which are exemplifications of the best mode of construction and manner of using the invention. The appended claims are intended to cover the embodiments shown as well as variations thereof within the scope and purview of the invention.

Referring to the drawings:

FIG. 7 is a front perspective view of a modified embodiment of the present invention in open position.

FIG. 8 is a side elevational view of the embodiment shown in FIG. 7 but taken from the opposite side thereof.

FIG. 9 is a sectional elevational view of a modified embodiment of the present invention; this view being taken on the line 9—9 of FIG. 7.

FIG. 10 is a side elevational view of the embodiment of FIG. 7 in folded state.

Figure 3:
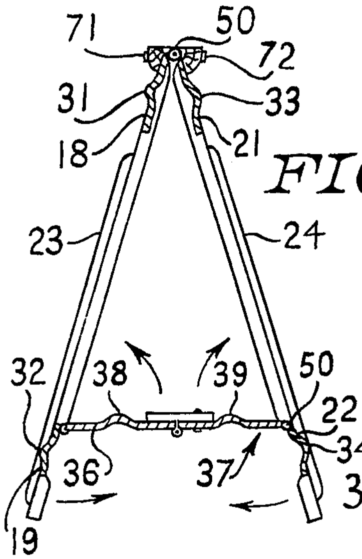
FIG. 3 is a sectional elevational view taken on the line 3—3 of FIG. 1.

In its best mode the foldable saw horse of my invention preferably comprises a pair of hingedly connected similar stampings each defining legs at opposite ends thereof connected together by integral upper and lower struts, together with transversely and longitudinally extending shelf sections hingedly connected to said struts and together at the transverse center of the structure, and means for latching said shelf sections together to enhance the rigidity of the structure in use as well as for readily unlatching said shelf sections to permit folding of thereof and the saw horse for storing when not in use and for latching the shelf sections to the legs during storage of the structure.

In accordance with my invention, I provide a pair of similar structural members 11 and 12 which conveniently are stamped and rolled, as indicated hereinafter, from suitable sheet metal such as aluminum or lightweight steel or an alloy of steel but which can be cast or be molded from fibreglas or from a reinforced plastic material as desired. Each of the structural members 11 and 12 is so fashioned as to define legs 13 and 14 as wells as legs 16 and 17, respectively, at opposite ends thereof; the legs 13 and 14 being connected together by upper and lower struts 18 and 19, respectively, while the legs 16 and 17 at the opposite ends of member or stamping 12 are connected together by upper and lower struts 21 and 22, see FIG. 1.

To give rigidity to the similar stampings 11 and 12 and enable them to be self-sustaining in a balanced structure when set up for use, each of the legs 13, 14, 16 and 17 is so formed as to provide a reinforcing ridge longitudinally thereof and at their approximate transverse centers, 23, 24, 26 and 27, and each of the legs is further strengthened by rounding the lateral edges thereof. Similarly, each of the upper and lower struts of each of the structural members 11 and 12 is so formed as to provide centrally located longitudinally extending reinforcing ribs 31, 32, 33 and 34 therein. Moreover, to lend strength and rigidity to lower shelf sections 36 and 37, which extend both longitudinally and transversely of the structure and which project inwardly from lower struts 19 and 22, longitudinally extending center ridges or ribs 38 and 39 are provided therein.

Figure 1:
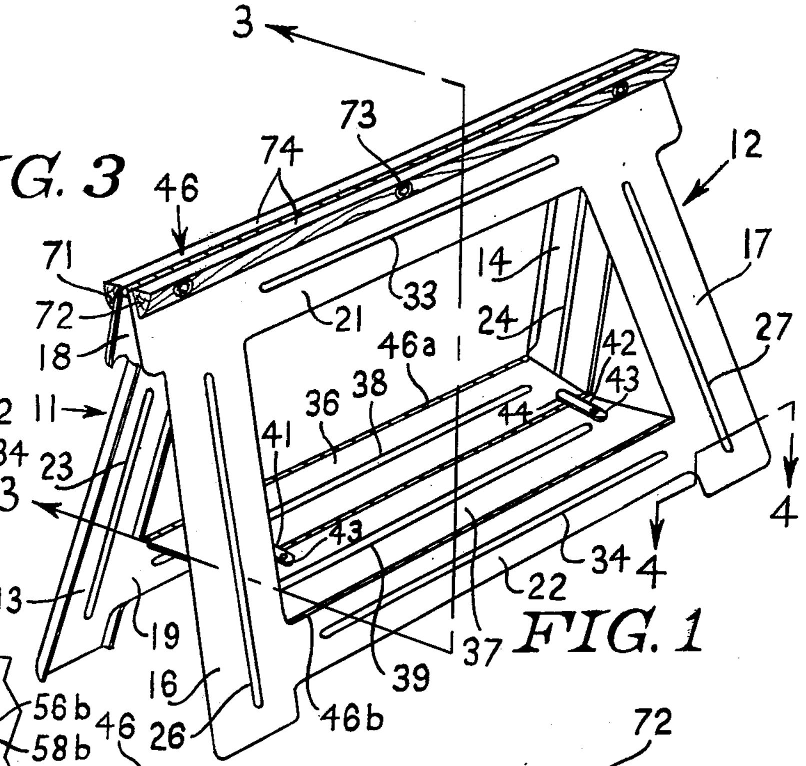
FIG. 1 is a front perspective view of a preferred embodiment of the invention as set up for use.
Figure 2:
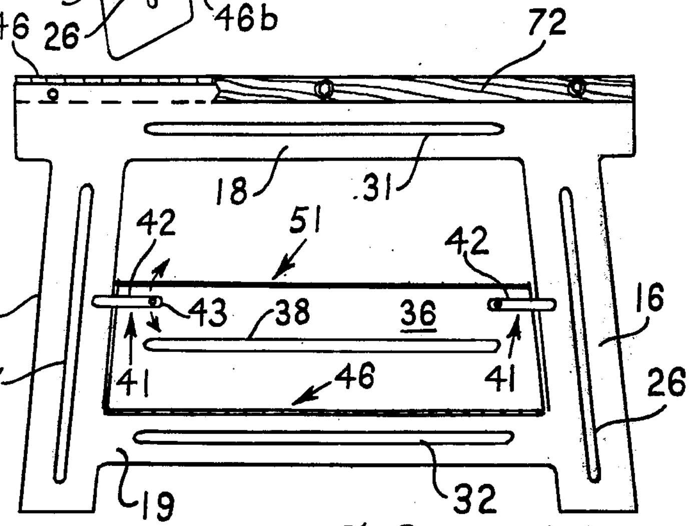
FIG. 2 is a side elevational view of the embodiment of my invention shown in FIG. 1, in folded state for storage.
Figure 4:
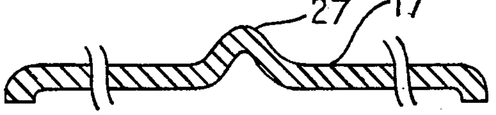
FIG. 4 is an enlarged sectional detail taken on the line 4—4 of FIG. 1.

As illustrated particularly in FIGS. 1 to 3 of the annexed drawings, I provide latching means for holding the shelf sections 36 and 37 firmly against displacement when the saw horse is set up for use, see FIG. 1, and for permitting these shelf sections to be raised, see FIG. 3, when the saw horse is collapsed for storing, as well as for holding the shelf sections to the end legs of the structure when not in use. Preferably two of the latching means are employed in unison and are manually adjusted to latching and unlatching positions; such two latching means being designated generally by the reference numerals 41 and 42 and consisting of a pivot pin 43 on which a latch segment 44 is mounted for movement between a latching position spanning both shelf sections 36 and 37 see FIG. 1, and an unlatched position extending along one of the shelf sections only, as shown in FIG. 2. Moreover for movement, from a position extending along a single shelf position to a position overlying a portion of a leg and extending transversely of the leg to limit the outward movement of the shelf sections while collapsed and stored, see FIG. 2.

Figure 5:
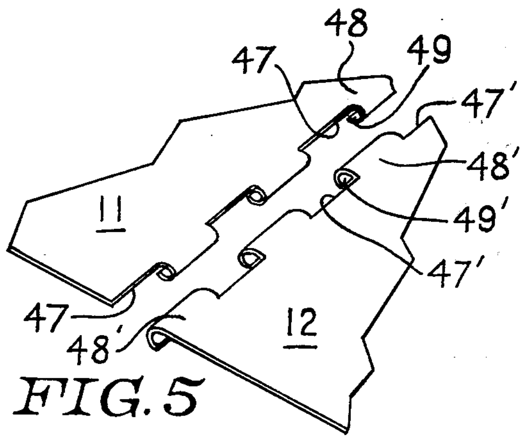
FIG. 5 is an enlarged fragmentary detail of the outer edge portions of the sides as well as of the shelf sections of the preferred embodiment of my present invention.
Figure 6:
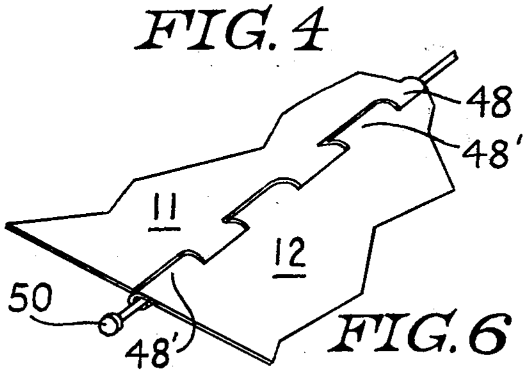
FIG. 6 is a view similar to FIG. 5 but with the hinge components for my foldable saw in assembled operative state.

As illustrated in FIGS. 1, 2 and 3, the two similar structural members 11 and 12 are pivotally secured together at the tops thereof by a conventional piano hinge, designated generally by the reference numeral 46; and the shelf sections 36 and 37 are pivotally mounted at their outer edges to the top edges of the lower struts 19 and 22, respectively, by similar piano hinges **46*a* and 46*b*, respectively, see FIG. 3. These piano hinges 46, 46*a* and 46*b* are fashioned during the manufacture of the structural members 11 and 12 with the top edges thereof turned upon themselves or rolled at spaced intervals to define an alternation of notches 47 and rolled segments 48 each defining a passage 49 in one structural member 11 in staggered relationship with an alternation of similar notches 47' and rolled segments 48' defining passages 49' in the other structural member 12, see FIG. 5 of the annexed drawings. As illustrated in FIG. 6, when the tops of the two structural members 11 and 12 are brought together with the notches and rolled segments interlacing each other, and a pintle pin 50 is extended through the passages 49, 49' of the rolled segments 48, 48', the two members 11 and 12 are pivotally connected to afford the foldable saw horse to that extent. In the same manner, the outer portions of the shelf sections 36 and 37 are fashioned to provide an alternation of notches 47 and rolled segments 48 defining passages 49 for the reception of a pivot pin 50 after the shelf sections have been mounted on the upper edges of the lower struts 19 and 22 of the structural members 11 and 12, respectively, which upper edges have been similarly formed with an alternation of notches and rolled segments in staggered relation to the notches and rolled segments on the outer edges of the shelf sections 36 and 37. Thus, the shelf sections are pivotally assembled on such lower struts 19 and 22**, respectively.

Figure 5A:
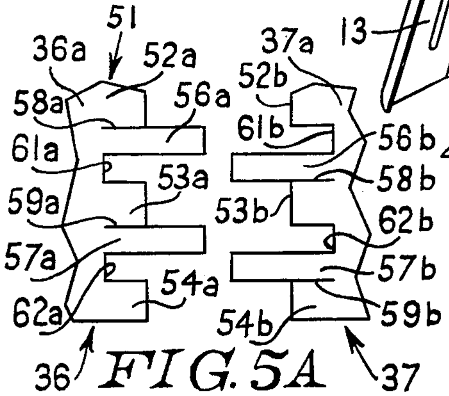
FIG. 5A is an exploded fragmentary plan view of complementary members of my novel hinge employable for holding elements in swingable relationship with abutting confronting edges.
Figure 5B:
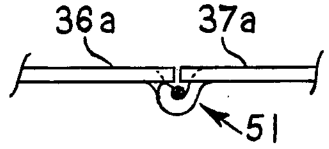
FIG. 5B is an end elevational view of my novel hinge assembled.

In accordance with my present invention, a specially constructed hinge, generally designated by the reference numeral 51, is provided for hingedly connecting the shelf sections 36 and 37 together at their confronting inner edges in order that a more rigid full shelf is attained with abutting inner edges serving to limit the extent of movement of the hinge. The construction of the hinge 51 is clearly illustrated in FIG. 5A of the accompanying drawings and is also shown in operative position in FIG. 5B. With reference to FIG. 5A, it will be observed that the inner portions **36*a* and 37*a* of the shelf sections 36 and 37 are fashioned as to provide confronting complementary faces defining, with respect to inner portion 36*a*, inflexible short segments 52*a*, 53*a* and 54*a* in spaced relationship to one another and each having a straight inner edge thereon; spaced apart bendable long segments 56*a* and 57*a* contiguous to short segments 52*a* and 53*a* which are bendable in relation thereto by virtue of spaced apart slits 58*a* and 59*a*, and also defining spaced apart notches 61*a* and 62*a*, while the complementary inner portion 37*a* is so fashioned as to define inflexible short segments 52*b* and 54*b* in spaced relationship to one another and having straight inner edges; spaced apart bendable long segments 56*b* and 57*b* contiguous to short segments 53*b* and 54*b* which are bendable in relation thereto by virtue of the spaced apart slits 58*b* and 59*b*; and also defining spaced apart notches 61*b* and 62*b*. This formation of such inner portions 36*a* and 37*a* of the shelf sections 36 and 37 enables these inner portions to dovetail into one another with the long segments 56*a* and 57*a* entering the notches 61*b* and 62*b* and with the long segments 56*b* and 57*b* entering the notches 61*a* and 62*a* and with the opposed straight edges on short segments 52*a*, 53*a* and 54*a* in abutting relation to the straight edges on short segments 52*b*, 53*b* and 54*b*. It is to be understood that the long segments 56*a*, 57*a*, 56*b* and 57*b* are rolled or turned back upon themselves during the manufacture of shelf sections to define a series of aligned hollow passages for receiving a single pivot pin 63, see FIG. 5B when the shelf sections are assembled and pivotally mounted on the piano hinges on the upper edges of struts 19 and 22 and outer edges of the shelf sections swinging on pivot pins 50**.

A modified embodiment of the present invention is illustrated in FIGS. 7 to 10 inclusive of the annexed drawings and comprises a comparatively large stamping 111 which swingably supports thereon a comparatively small stamping 112 by means of a suitable hinge connection. Each of the two stampings 111 and 112 is fabricated from a light-weight metal such as aluminum or an aluminum alloy, or molded from fibreglas or from a suitable plastic material, as desired. The stamping 111 is so fashioned as to define a pair of end legs 113 and 114 while the smaller stamping defines a pair of end legs 116 and 117; the end legs 113 and 114 being joined together by integral upper and lower struts 118 and 119 respectively, while the end legs 116 and 117 are joined together by integral upper and lower struts 121 and 122, respectively; it being noted that the lower strut 119 is recessed from its upper edge and at its center, as indicated at 120, for a purpose hereafter described. These two structural members 111 and 112 are strengthened in the same manner as members 11 and 12 of the preferred embodiment shown in FIGS. 1 to 3 inclusive, by providing center ridges 123, 124, 126 and 127 in legs 113, 114, 116 and 117, respectively, as well as providing ridges 131, 132, 133 and 134 in the upper and lower struts 118, 119, 121 and 122, respectively, of such members 111 and 112, respectively.

In order to lend rigidity to the modified embodiments of FIGS. 7 to 10 inclusive as well as to hold the structural members 111 and 112 in spaced relationship to one another when set up for use, I provide a flat shelf 136 which is fabricated in sheet form from material similar to the sheet sections 36 and 37 of the preferred embodiment, which are fashioned with a centrally located strengthening ridges 137 and formed with a depending dovetail 138 on an outer edge for fitting into the recess 120 on the upper edge of lower strut 119 of structural member 111, see FIG. 10 I also mount on the lower strut 119 an anchored resilient strip including a hook 139 thereon which engages the top of the shelf 136 and holds it in operative position during the use of the saw horse but which resilient strip can be sprung away and the hook 139 released to permit folding of the shelf on its hinged connection to the larger structural member, which connection is a conventional piano hinge including a pivot or pintle pin 165 serving to hingedly connect the hinge sections together on the outer edge of shelf 136 and on the upper edge of lower strut 122 of structural member 111.

It is to be observed that my modified saw horse is so constructed that I hingedly secure the members 111 and 112 together at the joint between the upper edge of the top of the smaller stamping 112 and the lower edge of the upper strut 118 of the larger stamping 111, utilizing a standard piano hinge with turned-in or roller segments 167 on stamping 111 fitting opposed notches, not shown, formed in the smaller stamping 111 at the upper edge of the top thereof, and with turned-in or rolled segments 168 on stamping 112 fitting opposed notches, not shown, in the larger stamping 111, together with a pivot or pintle pin 169 extending through the passages, not shown, formed by the rolled segments 167 and 168, as indicated in FIGS. 8 to 10 inclusive.

These relatively simple constructions of both the preferred and modified cmbodiments of the invention, as thus far described, can be set up and used, as well as folded and stored away with relative ease. In order to provide a planar and wider seating surface for the reception of different types of work to be sawed and even planed while supported on either a single horse or trestle, or upon two spaced apart saw horses, of either the preferred or the modified type, I secure wooden runners 71 and 72 as well as 171 and 172 to the stampings 11 and 12, respectively as well as both sides of stamping 111, see FIG. 7, adjacent to the tops thereof by means of spaced apart screw bolts 73 and 173, respectively, to present the upper surfaces 74 and 174 of such runners substantially flush with the upper edges of stamping 11, 12 and 111, thus affording level wide seats for the work disposed on the saw horses.

It is to be understood that the appended claims are intended to cover the embodiments illustrated in the accompanying drawings as well as variations thereof within the scope and purview of the invention.

I claim:

1. A foldable saw horse comprising a pair of similar stampings hingedly connected together at the tops thereof forming an elongated supporting surface and each defining a pair of legs at opposite ends thereof, upper and lower struts intermediate the top and bottom of each of said pair of stampings and spanning the defined legs thereof, and a pair of shelf sections hingedly secured together and spanning the lower struts to which each shelf section is hingedly connected.

2. A foldable saw horse as set forth in claim 1, and a runner removably secured to the outer surface of each of said stampings adjacent to the tops thereof; the upper surfaces of said runners lying flush with the upper surfaces of the tops of said stampings.

3. A foldable saw horse as set forth in claim 1, and latching means pivotally mounted on one shelf section and swingable to span both of said shelf sections whereby both shelf sections are restrainable against movement.

4. A foldable saw horse as set forth in claim 1, wherein each of said pair of legs and each of said upper and lower struts of each of said stampings is ribbed at their transverse centers.

5. A foldable saw horse as set forth in claim 1 wherein said upper and lower struts are integral with said stampings.

6. A foldable saw horse comprising a large sheet defining a pair of legs at opposite ends thereof, a small sheet hingedly connected to said large sheet between said pair of legs to enable movement outwardly and inwardly with respect to said large sheet, upper and lower struts connecting the pair of legs defined in said large sheet, legs on opposite ends of said small sheet, upper and lower struts connecting said legs on said small sheet, and a shelf hingedly mounted on said lower strut of said small sheet and removably mounted on the lower strut of said large sheet.

7. A foldable saw horse as set forth in claim 6 wherein a resilient strip is fixedly secured to said lower strut of said large sheet, a hook on said resilient strip removably engageable with said shelf whereby said shelf is removably mounted on the lower strut of said large sheet.

8. A foldable saw horse as set forth in claim 3, wherein said latching means comprises a pair of pivot pins located on said one shelf section at opposite longitudinal ends thereof in close proximity to said legs at opposite ends of said stampings, and a latch segment on each of said pair of pivot pins for movement to positions overlying a portion of each of said legs.

* * * * *